Aug. 24, 1937.   H. L. CHISHOLM, JR   2,090,621
HYDRAULIC SHOCK ABSORBER
Filed March 21, 1936
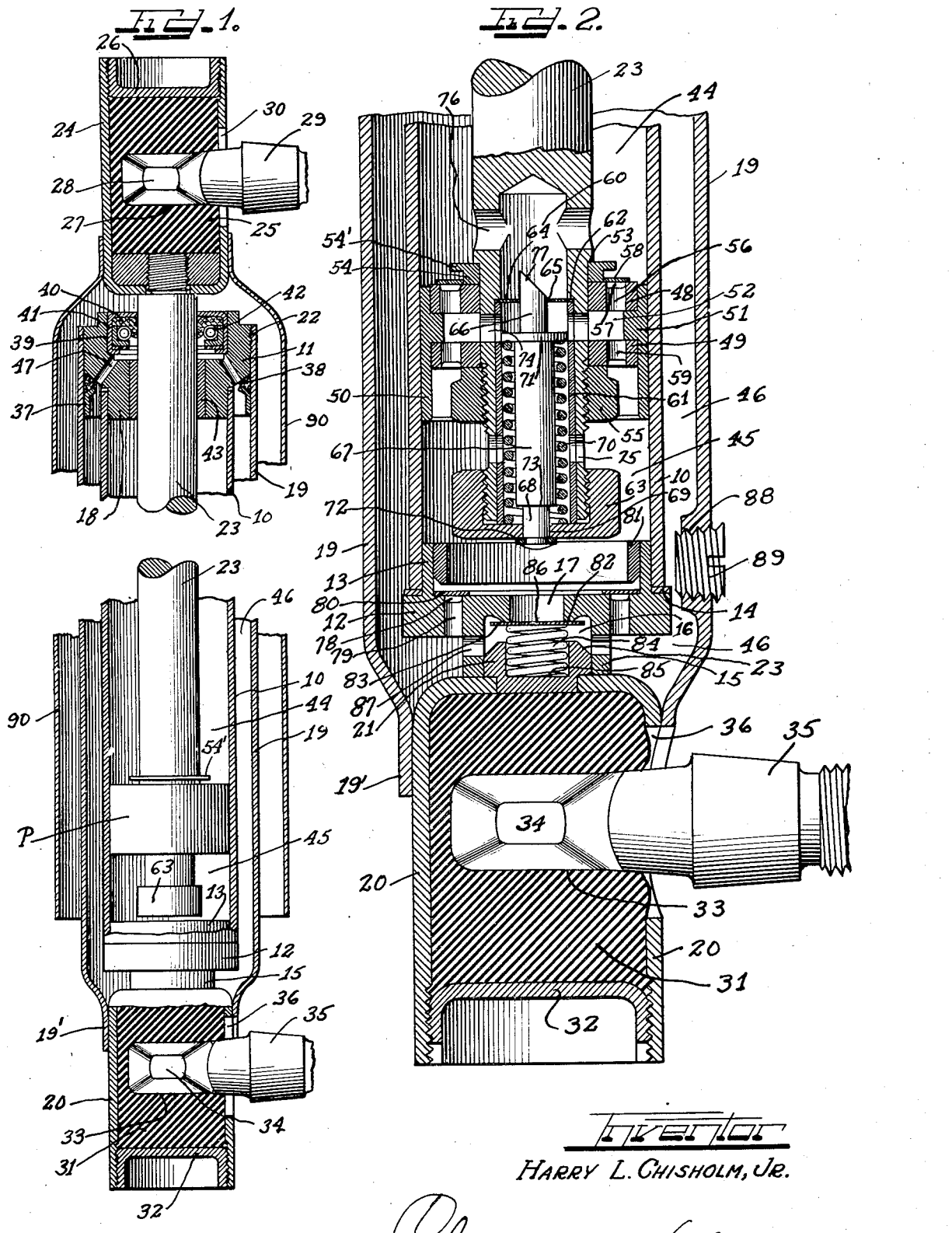
Inventor
HARRY L. CHISHOLM, JR.
by Charles Orbell Attys.

Patented Aug. 24, 1937

2,090,621

UNITED STATES PATENT OFFICE 2,090,621

HYDRAULIC SHOCK ABSORBER

Harry L. Chisholm, Jr., Buffalo, N. Y., assignor to Houde Engineering Corporation, Buffalo, N. Y., a corporation of New York Application March 21, 1936, Serial No. 70,045

10 Claims. (Cl. 188—88)

My invention relates to hydraulic shock absorbers comprising relatively movable cylinder and piston elements adapted for connection respectively with the body and axle structure of an automotive vehicle, the invention concerning particularly the direct acting type of shock absorber in which the cylinder is of tubular form and the piston structure is adapted for longitudinal movement therein.

An important object of the invention is to provide an improved shock absorber structure in the form of a tubular link adapted at the ends of the cylinder and piston structures for direct coupling engagement with fittings on a vehicle body and axle structure.

A further important object of the invention is to provide simplified and more efficient valving arrangements for controlling the flow of the displaced hydraulic fluid during relative movement between the cylinder and piston elements, which valving means will efficiently compensate for volumetric difference caused in the high and low pressure hydraulic working chambers by the piston rod of the piston, and which valving means will also efficiently assure the proper shock absorber action during temperature and viscosity variations of the hydraulic fluid and will automatically provide for increased fluid flow passageway during periods of abnormal pressure conditions to which the fluid may be subjected during travel of a vehicle, in order to prevent injury to the shock absorber parts and its connections with the vehicle structure.

The above enumerated and other features of the invention are incorporated in the structure disclosed on the drawing, in which drawing:

Figure 1 is a side elevation, partly in section, of the shock absorber structure.

Figure 2 is an enlarged diametral longitudinal section of the lower end of the shock absorber structure to show the construction, arrangement and operation of the valving means.

The cylinder element comprises a straight cylinder tube 10 extending between upper and lower heads 11 and 12. The lower head 12 is in the form of a cylindrical plate having the upstanding annular flange 13 a distance inwardly of its edge around which the lower end of the cylinder tube engages, with a sealing gasket 14 interposed between the head and the lower end of the tube.

The head 12 has a depending flange 15 concentric therewith which surrounds the lower portion of the valve recess or chamber 16 in the head, this chamber communicating with the passageway 17 extending upwardly through the head.

The upper head 11 has the neck 18 which receives the upper end of the cylinder tube 10. Surrounding the cylinder tube, concentric therewith but spaced a distance therefrom, is the outer tube 19 which at its lower end is contracted to form a cylindrical neck 19' into which the base end of a cylindrical cup 20 extends and is rigidly secured, preferably by welding. Secured to and extending upwardly from the cup bottom is a guide lug or plug 21 for receiving the lower end of the flange 15 on the lower cylinder head 12. At its upper end the outer tube 19 receives the upper cylinder head 11 and has threaded connection therewith as indicated at 22. After the heads have been applied to the cylinder tube, the outer tube 19 is slipped up around the cylinder tube and is turned for threading onto the upper head, the outer tube thus drawing the heads firmly against the cylinder tube ends and clamping the lower head 12 against the base of the cup 20. In order that the plug 21 may readily enter the flange 15 of the lower head, the outer edge of the plug is beveled as indicated at 23.

Within the cylinder tube 10 is the piston structure designated as a whole P. This piston structure has a piston rod 23 extending upwardly therefrom through the upper cylinder head 11, and at its upper end the rod is secured to the bottom of a cup frame 24. The upper and lower cup structures 24 and 20 form part of the connection between the shock absorber structure and the vehicle body and axle. As shown, the upper cup structure 24 has the yieldable coupling element 25 clamped therein by a plug 26, this coupling member being preferably of rubber. The yieldable coupling member has a cavity 27 therein for receiving the flattened head 28 at the end of a stud 29 which is secured in any suitable manner to the vehicle body, the cup having a side opening 30 through which the stud head may be inserted into the yieldable coupling member.

The lower cup 20 has a yieldable coupling element 31 in the form of rubber clamped therein by the plug 32, its cavity 33 receiving the flattened end 34 on the stud 35 which may be secured in any suitable manner to the axle structure of the vehicle, the cup having the side opening 36 to which the stud end may be inserted for engagement in the cavity of the yieldable coupling member.

In the upper end of the outer tube 19 an abutment ring 37 is secured, as by welding, and between this abutment ring and the adjacent shoulder of the upper head 11 is inserted a gasket 38 of suitable material such as rubber, this gasket being compressed when the outer tube 19 is threaded to the head 11 and forms a sealed joint. In the upper end of the head 11 is the recess or pocket 39 surrounding the piston rod 23 and in this cavity a suitable packing construction may be applied. As shown a packing ring 40 of suitable material is confined within a housing 41 and urged against the piston rod by a spring member 42. In the lower end of the head 11 a bushing 43 is applied around the piston rod and this bushing may be of suitable material to afford good bearing for the rod.

The piston structure P divides the cylinder 10 into the upper or high pressure hydraulic working chamber 44 and the lower or low pressure hydraulic working chamber 45, which chambers are filled with suitable hydraulic liquid. The space between the cylinder tube 10 and the outer tube 19 provides a fluid reservoir or replenishing chamber 46, and the upper head 11 has drain passages 47 connecting the packing recess 39 with the upper end of the replenishing chamber so that any fluid which may have leaked upwardly along the piston rod past the bushing 47 will be returned to the replenishing chamber.

Describing now the piston structure P, it comprises upper and lower annular walls 48 and 49 surrounded by the cylindrical outer wall or shell 50 and held spaced apart by the annular lug 51 on the wall 50 to leave the annular passageway 52. The lower end of the piston rod is of reduced diameter to provide a shoulder 53 against which seats an abutment ring 54 which engages the reduced end of the piston rod. The walls 48 and 49 also receive the reduced end of the piston rod and a nut 55 has threaded engagement with the rod for clamping the piston assembly and the abutment ring 54 between the nut and the shoulder 53, thus to securely hold the piston assembly to the piston rod, the outer wall 50 of the piston assembly snugly engaging with the inner side of the cylinder tube 10.

Extending transversely through the upper wall 48 are one or more ports 56 extending between the passageway 52 and the annular channel 57 in the top of the wall 48, a valve 58 in the form of an annular disc surrounding the abutment ring 54 and to reciprocate thereon for opening or closure of the channel 57 and the ports 56 relative to the upper or high pressure working chamber 44. A flange 54' on the abutment ring 54 limits the upward movement of the valve disc.

One or more ports 59 through the lower piston wall 49 connect the passageway 52 with the lower or low pressure working chamber 45, these ports being always open to fluid flow.

At its lower end the piston rod has the axial bore 60 in the lower part of which is inserted the tube 61 against a shoulder 62, this tube forming a valve chamber. A cap 63 has screw thread engagement with the end of the piston rod and abuts the tube 61 to hold it in place against the shoulder 62.

Clamped between the upper end of the tube 61 and the shoulder 62 is an orifice disc 64 having the central opening or passageway 65 through which extends a cylindrical valve head or plug 66. Extending from the valve plug is the stem 67 which at its lower end has the reduced guide end 68 extending through the opening 69 in the cap nut 63. Within the tube 61 is a spring 70 surrounding the stem and abutting the cap nut and a flange 71 on the stem, the stop washer 72 on the outer end of the stem limiting the inward movement of the valve structure and the shoulder 73 on the stem limiting the outward movement, the spring tending to hold the valve structure with the valve plug 66 projecting through the passage 65 in the disc 64, the diameter of the passage 65 being preferably slightly greater than the diameter of the valve plug 66 so as to leave a restricted annular orifice passageway.

The piston annular passageway 52 is connected by ports 74 with the valve chamber, and ports 75 connect the valve chamber with the low pressure working chamber 45. Ports 76 connect the high pressure working chamber 44 above the piston structure with the upper end of the bore 60 in the piston rod.

The outer end of the valve plug 66 is of reducing cross-sectional area in order that when the valve structure is moved downwardly the area of the orifice passage 65 will be increased. As indicated at 77 the valve end is cut away on the bias. This bias end serves the additional purpose of providing for lateral pressure against the valve by the fluid flow which pressure tends to hold the valve structure against vibration during operation of the shock absorber.

In the upper side of the lower cylinder head 12 is the annular channel 78 from which ports 79 extend downwardly through the head to communicate with the lower end of the reservoir or replenishing chamber 46. Above the channel 78 and guided by the flange 13 is the annular valve disc 80 which is movable to open or close the channel 78, the upward movement of the valve disc being limited by the ring 81 secured in the flange 13.

The bottom of the valve chamber 16 in the head 12 is shaped to provide the annular valve seat 82 around the passageway 17, a valve disc 83 cooperating with the seat and being normally held thereagainst by a spring 84 which is seated in the pocket 85 in the plug 21 on the cup 20. The valve disc has the orifice 86 therethrough in alignment with the passageway 17. The valve chamber 16 is connected by ports 87 with the reservoir or replenishing chamber 46.

A filler opening 88 is provided in the tube 19 for the reservoir or replenishing chamber 46 and a closure plug 89 is provided for the opening. A shield tube 90 surrounds the cylinder structure of the shock absorber and is secured at its upper end to the cup 24 preferably by welding, this shield tube protecting the shock absorber structure against injury as from flying stones and also against dust and dirt.

Describing now the operation, the piston structure is normally at some intermediate point within the cylinder. During bump stroke of the piston, that is, during compression movement of the vehicle spring, the piston structure moves downwardly. The fluid in the low pressure chamber 45 is displaced by the piston and part of the fluid flows freely upwardly through the ports 59 and 56 and past the valve disc 58 into the high pressure working chamber 44 thus tending to equalize the pressure in the working chambers. The volume of fluid displaced from the low pressure chamber is greater than the volumetric increase of the chamber 44 by the displaced volume of the piston rod above the piston. This excess volume of fluid flows normally through the orifice 86 in the valve disc 83 and through the valve chamber 16 and ports 87 into the replenishing chamber 46, this orifice metering the fluid flow, the pressure to which the fluid is subjected being determined by the projected area of the piston rod, for, as previously explained, the pressure at opposite sides of the piston itself is balanced by the opening of the check valve 58.

Under normal or ordinary pressure conditions, the valve 83 will be held against its seat by the spring 84 but, should the fluid viscosity increase due to climatic changes, or should the piston structure be subjected to excessively rapid downward travel, the pressure against the valve disc 83 will overcome the spring 84 and unseat the valve to allow bypassage of fluid for relieving the excess pressure, the valve again closing for exposure only of the orifice 86 as soon as normal conditions are resumed.

During rebound movement of the vehicle spring the piston structure is moved upwardly in the cylinder and the valve 58 is moved by the pressure to close passageway through the ports 56 and 59 and the displaced fluid must therefore flow from the upper or high pressure working chambers through the ports 76 into the piston rod and then through the restricted annular orifice 65 into the valve chamber and from there through the passage 52 and the ports 59 to the low pressure working chamber 45.

Under ordinary pressure and climate conditions the spring 70 will hold the valve plug 66 in normal position so that the fluid flow will be metered by the restricted annular orifice 65. But under abnormal pressure or viscosity conditions, the pressure against the valve will overcome the spring and the valve will be shifted downwardly to bring its biased end into the orifice passage to increase the area of the passage for relief of the abnormal pressure or viscosity conditions until normal conditions are again resumed.

Owing to the volumetric difference of displacement between the high pressure and low pressure working chambers 44 and 45 upon upward movement of the piston structure, suction will be created in the low pressure working chamber 45 which will raise the valve 80 from its seat and draw fluid into the low pressure chamber from the replenishing chamber 46 in order that the working chambers may be kept filled with fluid, the valve 80 being kept closed by the pressure during downward movement of the piston structure.

As the orifice disc 64 is comparatively thin, the edge surrounding the orifice passage is sharp and under ordinary viscosity change in the fluid this type of orifice will compensate for such viscosity variations and the shock absorbing resistance will not be materially interfered with. The valve disc 83 is also thin so that the orifice 86 will present a sharp edge for metering of the fluid flow without material influence by viscosity variations.

By means of the yieldable connecting elements 25 and 31, the shock absorber structure can be directly applied to supporting studs extending from the vehicle body and axle structure and during travel of the vehicle these yieldable connecting members will relieve the shock absorber structure of all unnecessary strain so that it may operate freely and efficiently at all times for control of the vehicle spring.

I have shown a practical and efficient embodiment of the various features of my invention but I do not desire to be limited to the exact construction, arrangement and operation shown and described as changes and modifications may be made without departing from the scope of the invention.

I claim as follows:

1. A hydraulic shock absorber of the class described comprising an outer tube having an end wall, an inner cylinder forming tube having detachable heads at its ends, one of said heads abutting the end wall of said outer tube and said outer tube at its other end having detachable connection with said other head for exerting clamping action to clamp said heads to said cylinder tube, a piston structure operable in said cylinder tube, and a piston rod extending from said piston structure through one of said heads.

2. A hydraulic shock absorber of the class described comprising an outer tube having a coupling frame secured to one end thereof for adapting said end for connection with a support, an inner tube having outer and inner detachable heads and forming therewith a cylinder structure, said inner head abutting said coupling frame at the end of said outer tube and the other end of said outer tube having threaded engagement with the outer cylinder head whereby said outer tube serves as a clamp for holding said heads to said inner tube, a piston structure operable within said cylinder structure, a piston rod extending from said piston structure through said outer head, and a coupling frame secured to the outer end of said connecting rod for connecting said rod with a support.

3. A hydraulic shock absorber of the class described comprising an outer sheet metal tube, an inverted cup frame secured to one end of said tube to form a closure therefor and to form part of coupling means for securing the end of the tube to a support, a cylinder structure within said outer tube comprising a cylinder tube and inner and outer detachable heads therefor, said cup frame forming an abutment for the inner cylinder head and said outer tube at its other end being secured to the outer cylinder head whereby said heads will be held to the cylinder tube, a piston rod extending into said cylinder tube through the outer head thereof, a piston structure secured to the inner end of the piston rod, and a cup shaped frame secured to the outer end of said piston rod serving as part of coupling means for connecting the rod with a support.

4. A hydraulic shock absorber of the class described comprising a cylinder structure, a piston shaft extending into said cylinder structure from the exterior thereof, a piston structure secured to said shaft and dividing the space within said cylinder structure into high pressure and low pressure working chambers at the outer and inner sides thereof respectively, said piston structure having a passageway therethrough for comparatively free flow of hydraulic fluid from the low pressure chamber to the high pressure chamber during inward movement of the piston structure and shaft, a check valve on the high pressure side of said piston structure for closing said passageway during outward movement of the piston structure and shaft, said shaft having a bore connected above and below said piston structure with said high pressure chamber and low pressure chamber respectively, and valving means within said bore for controlling the flow from the high pressure to the low pressure chamber when said check valve is closed, said valving means comprising a cross wall in said bore having a passageway therethrough and a valve plug projecting thereinto to define a permanently open annular orifice, said valve plug being movable by fluid pressure and being shaped to increase the size of said orifice when so moved.

5. A hydraulic shock absorber of the class described comprising a cylinder structure, a piston shaft extending into said cylinder structure from the exterior thereof, a piston structure secured to said shaft and dividing the space within said cylinder structure into high pressure and low pressure working chambers at the outer and inner sides thereof respectively, said piston structure having a passageway therethrough for comparatively free flow of hydraulic fluid from the low pressure chamber to the high pressure chamber during inward movement of the piston structure and shaft, a check valve on the high pressure side of said piston structure for closing said passageway during outward movement of the piston structure and shaft, said shaft having a bore connected above and below said piston structure with said high pressure chamber and low pressure chamber respectively, a disc within said bore having a circular opening therethrough, a valve structure in said bore having a cylindrical valve end projecting into said circular opening and defining therewith an annular restricted orifice passageway, spring means tending to hold said valve end in normal position within said opening, said orifice passageway controlling the flow of hydraulic fluid from the high pressure chamber to the low pressure chamber when said check valve is closed, said valve end being of reducing cross-section whereby when said valve structure is moved against the spring resistance under abnormal pressure conditions said reduced end will increase the area of the orifice passage for increased fluid flow for relieving the pressure.

6. A hydraulic shock absorber of the class described comprising a cylinder structure, a piston shaft extending into said cylinder structure from the exterior thereof, a piston structure on said shaft dividing the space within the cylinder structure into high pressure and low pressure hydraulic working chambers, means providing a passageway through said piston for comparatively free flow of hydraulic fluid from the low pressure chamber to the high pressure chamber, a check valve for preventing flow in reverse direction through said passageway, said shaft having a bore at its inner end and ports connecting said bore with the high pressure working chamber, ports connecting said bore with the passageway through said piston for connection of said bore with the low pressure chamber, a wall across said bore between said ports, said wall having a passageway therethrough, a valve structure in said bore comprising a valve plug projecting into said wall passageway to define an annular restricted orifice for metering the fluid flow from the high pressure chamber to the low pressure chamber, a spring tending to hold said valve structure in normal position, said valve plug being shaped to increase the size of said orifice when said valve structure is shifted by abnormal fluid pressure.

7. A hydraulic shock absorber of the class described comprising a cylinder, a piston structure comprising a piston and a piston rod extending therefrom outwardly through one end of the cylinder, said piston structure dividing said cylinder into an outer or high pressure hydraulic working chamber and an inner or low pressure hydraulic working chamber, valve means on said piston structure for controlling the fluid flow between opposite sides of the piston during inward and outward movement of the piston structure in the cylinder, means providing a reservoir and a passageway therebetween and the low pressure working chamber, a valve in said passageway having a restricted orifice therethrough, spring means tending to hold said valve closed against normal fluid pressure to present only said orifice for flow from the low pressure working chamber to the reservoir when the piston structure moves inwardly but to yield to abnormal pressure flow to permit opening of said valve for freer flow, and a bypass around said valve for comparatively free flow from the reservoir to the low pressure working chamber during outward movement of the piston structure.

8. A hydraulic shock absorber of the class described comprising a cylinder, a piston structure comprising a piston and a piston rod extending therefrom outwardly through one end of the cylinder, said piston structure dividing said cylinder into an outer or high pressure hydraulic working chamber and an inner or low pressure hydraulic working chamber, valve regulated passageways for controlling the fluid flow between opposite sides of the piston as the piston structure reciprocates, means providing a fluid reservoir and a passage therebetween and the low pressure working chamber, a valve structure interposed in said passage and arranged to permit only restricted fluid flow from the low pressure chamber to the reservoir under normal fluid pressure conditions during inward travel of the piston structure but yieldable for freer flow under abnormal pressure conditions, and a separate passage between said reservoir and low pressure chamber closed during inward movement of the piston structure but open for comparatively free flow of fluid into the low pressure chamber during outward movement of the piston structure.

9. A hydraulic shock absorber of the class described comprising a cylinder, a piston structure comprising a piston and a piston rod extending therefrom outwardly through one end of the cylinder, said piston structure dividing the cylinder into an outer or high pressure hydraulic working chamber and an inner or low pressure hydraulic working chamber, valve controlled passageways for regulating the flow of fluid from one side of the piston to the other during reciprocation of the piston structure in the cylinder, means providing a fluid reservoir and a passage therebetween and the low pressure working chamber, a valve in the form of a thin disk interposed in said passage and having a restricted orifice, a spring calibrated to hold said valve for exposure of only said orifice for flow from the low pressure chamber into the reservoir during inward movement of the piston structure but to yield under abnormal pressure conditions for movement of the valve for freer flow, and a bypass around said valve for comparatively free flow into the low pressure chamber during outward movement of the piston structure.

10. A hydraulic shock absorber of the class described comprising an outer sheet metal tube, an inverted cup frame secured to one end of said tube to form a closure therefor and to form part of coupling means for securing the end of the tube to a support, a cylinder structure secured within said outer tube, said cylinder structure comprising a cylinder tube and head therefor, a piston within the cylinder tube and a piston rod extending therefrom through the outer head of the cylinder tube, and a cup-shaped frame secured to the outer end of the piston rod serving as part of coupling means for connecting said rod with a support.

HARRY L. CHISHOLM, Jr.